United States Patent
Miyachi et al.

(10) Patent No.: US 6,527,450 B1
(45) Date of Patent: Mar. 4, 2003

(54) LATCHING SYSTEM FOR CONNECTOR ASSEMBLIES

(75) Inventors: Akihiro Miyachi, Fuchu (JP); Masashi Seto, Kanagawa (JP); Kenji Watanabe, Atsugi (JP)

(73) Assignees: Molex Incorporated, Lisle, IL (US); Sony Corporation, Tokyo (JP)

( * ) Notice: Subject to any disclaimer, the term of this patent is extended or adjusted under 35 U.S.C. 154(b) by 0 days.

(21) Appl. No.: 09/570,122

(22) Filed: May 12, 2000

(30) Foreign Application Priority Data

May 26, 1999 (JP) .............................................. 11-14066

(51) Int. Cl.[7] .................................................. G02B 6/38
(52) U.S. Cl. ............................................ 385/56; 385/55
(58) Field of Search .............................. 385/55, 56, 88, 385/89; 439/350–357

(56) References Cited

U.S. PATENT DOCUMENTS

| | | | | |
|---|---|---|---|---|
| 3,573,716 A | * | 4/1971 | Garver | 439/357 |
| 4,433,888 A | * | 2/1984 | Winger | 439/357 |
| 5,169,336 A | * | 12/1992 | Taguchi | 439/354 X |
| 5,376,016 A | * | 12/1994 | Inaba et al. | 439/357 X |
| 5,692,923 A | * | 12/1997 | Sawada | 439/350 X |
| 5,876,232 A | * | 3/1999 | Matsushita et al. | 439/357 |
| 5,915,057 A | * | 6/1999 | Weigel | 385/76 |
| 6,116,790 A | * | 9/2000 | Vergeest | 385/60 |
| 6,267,513 B1 | * | 7/2001 | Seto et al. | 385/56 |

* cited by examiner

*Primary Examiner*—Lynn Field
*Assistant Examiner*—Son V. Nguyen
(74) *Attorney, Agent, or Firm*—A. A. Tirva

(57) ABSTRACT

A connector assembly includes a plug connector having a plug housing and a sheath mounted about the plug housing. A receptacle connector receives the plug connector in mated condition. A complementary interengaging first latch is provided between the plug housing of the plug connector and the receptacle connector for holding the connectors in mated condition. A complementary interengaging second latch is provided between the sheath of the plug connector and the receptacle connector for holding the connectors in mated condition.

8 Claims, 4 Drawing Sheets

LATCHING SYSTEM FOR CONNECTOR ASSEMBLIES

FIELD OF THE INVENTION

This invention generally relates to the art of connector assemblies, such as fiber optic connector assemblies, electrical connector assemblies and the like, and particularly to a latching system for such connector assemblies.

BACKGROUND OF THE INVENTION

A connector assembly, such as a fiber optic connector assembly or an electrical connector assembly, typically includes a pair of mating connectors, such as plug and receptacle connectors sometimes called male and female connectors. The mating connectors sometimes include interengaging latch means to hold the connectors in mated condition. A typical latch means is provided by a flexible latch arm on one of the connectors latchingly engageable with a latch boss on the other of the connectors.

One type of plug connector for mating with a receptacle connector includes a plug housing and a sheath mounted on the plug housing. The interengaging latch means between the plug and receptacle connectors is provided by a flexible latch arm on the receptacle connector latchingly engageable with a latch boss on the sheath of the plug connector. The latch boss is moved out of engagement with the latch arm when the connectors are unmated. Unfortunately, such systems can result in inadvertent unmating of the connectors. Attempts have been made to solve this problem by increasing the strength of the resilient latch arm, but the resilient strength of the latch arm cannot be increased without undesirably increasing the mating and unmating forces on the connectors. The present invention is directed to solving these problems by providing a redundant latch means between the receptacle connector and the plug housing of the plug connector to maintain the connectors in mated condition notwithstanding inadvertent movement of the sheath and unlatching of the latch means between the sheath and the receptacle connector.

SUMMARY OF THE INVENTION

An object, therefore, of the invention is to provide a new and improved latching system for connector assemblies of the character described.

In the exemplary embodiment of the invention, a connector assembly includes a plug connector having a plug housing and a sheath mounted on the plug housing. A receptacle connector receives the plug connector in mated condition. Complementary interengaging first latch means are provided between the plug housing of the plug connector and the receptacle connector for holding the connectors in mated condition. Complementary interengaging second latch means are provided between the sheath of the plug connector and the receptacle connector for holding the connectors in mated condition.

The first latch means include at least one flexible latch member on one of the plug housing or receptacle connector engageable with a complementary latch member on the other of the plug housing or receptacle connector. As disclosed herein, the first latch means include a pair of flexible latch members on opposite sides of the receptacle connector engageable with a pair of latch bosses on opposite sides of the plug housing of the plug connector.

The second latch means include a flexible latch arm on one of the sheath or receptacle connector engageable with a complementary latch member on the other of the sheath or receptacle connector. As disclosed herein, the flexible latch arm is on one side of the receptacle connector and is engageable with a latch boss one side of the sheath of the plug connector.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
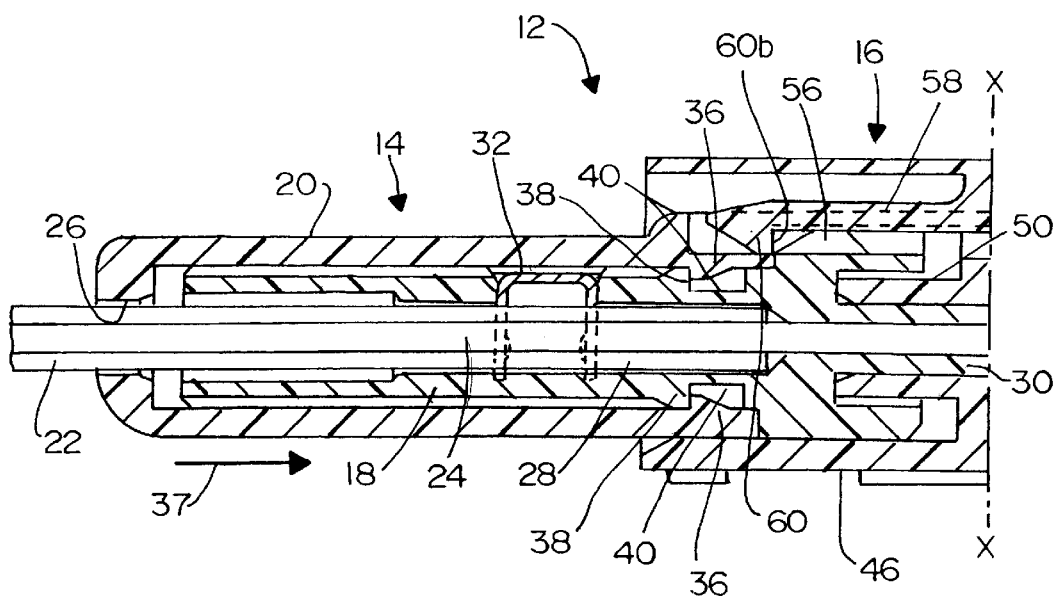
FIG. 1 is a longitudinal section through a fiber optic connector assembly according to the invention, with the plug and receptacle connectors in mated condition.
Figure 2:
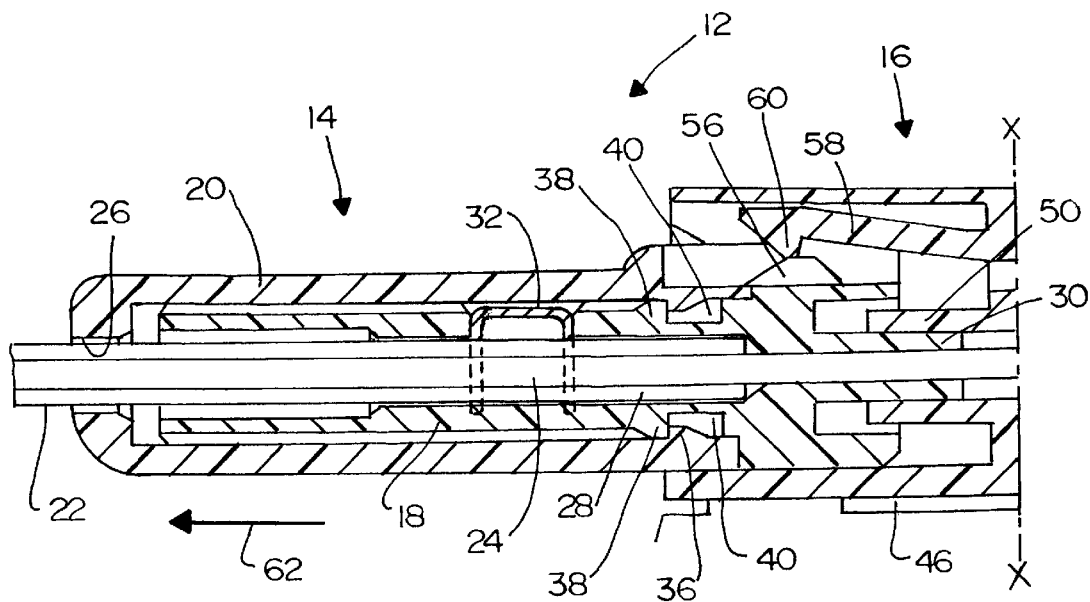
FIG. 2 is a view similar to that of FIG. 1, but with the connectors being unmated.

Referring to the drawings in greater detail, and first to FIGS. 1 and 2, the invention is embodied in a fiber optic connector assembly, generally designated 12, which includes a plug connector, generally designated 14, mateable in a receptacle connector, generally designated 16. Although the invention is shown as embodied in a fiber optic connector assembly, the concepts of the invention are equally applicable in electrical connector assemblies or the like.

Figure 3:
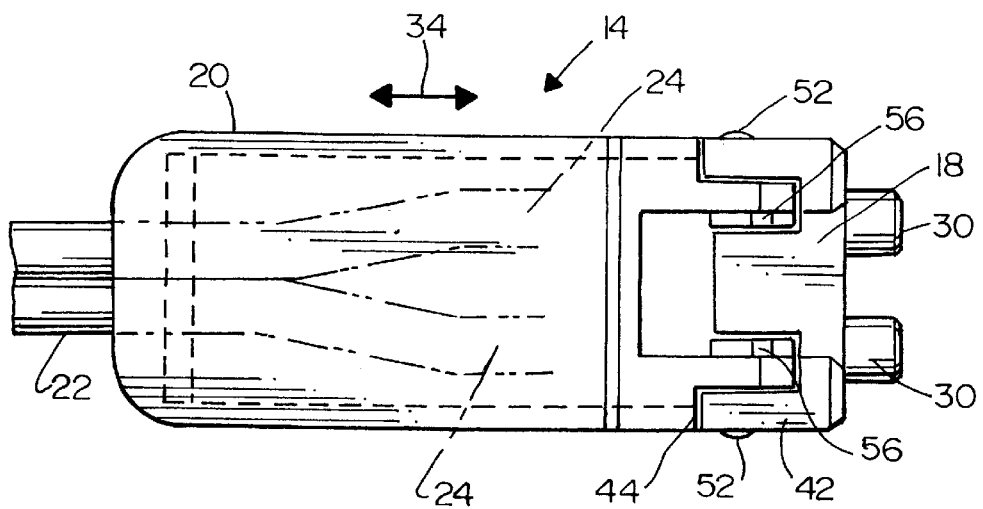
FIG. 3 is a top plan view of the plug connector of the connector assembly.
Figure 4:
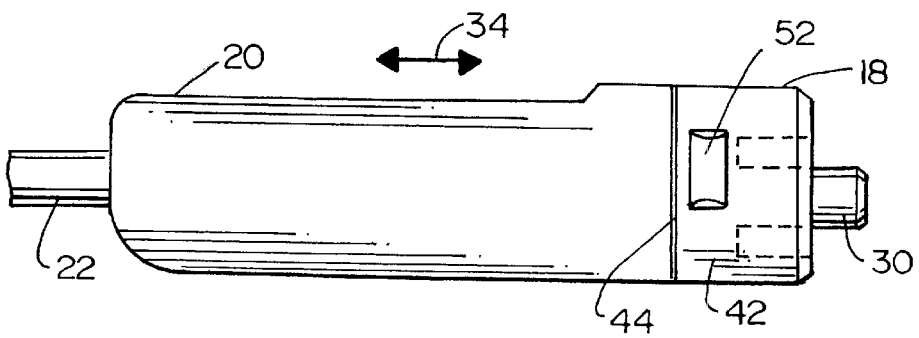
FIG. 4 is a side elevational view of the plug connector.
Figure 5:
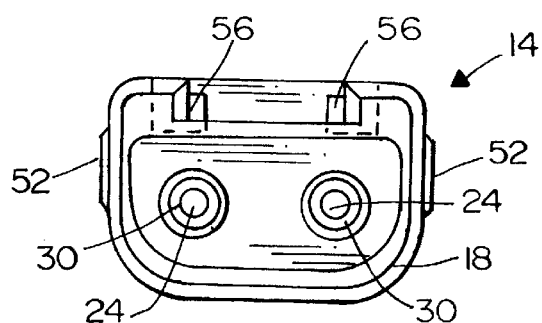
FIG. 5 is a front elevational view of the plug connector.

With that understanding, reference is made to FIGS. 3–5 in conjunction with FIGS. 1 and 2 to first describe plug connector 14. The connector is a two-part connector including a plug housing 18 and a sheath 20 mounted about the plug housing. The plug connector terminates a fiber optic cable 22 which is bifurcated as shown in FIG. 3 to include a pair of core fibers 24. As seen in FIGS. 1 and 2, fiber optic cable 22 extends into plug connector 14 through an aperture 26 at the rear of sheath 20. Core fibers 24 are stripped of their outer cladding 28, and the stripped core fibers extend forwardly into a pair of cylindrical plug portions 30 of plug housing 18. Cable fasteners 32 fix fiber optic cable 22 within the plug connector by piercing through outer coverings 28 about fiber cores 24. The plug connector is mated and unmated with the receptacle connector in the direction of double-headed arrows 34 in FIGS. 3 and 4. In other words, the plug connector is mateable longitudinally of fiber optic cable 22.

As best seen in FIGS. 1 and 2, sheath 20 is secured about plug housing 18 of plug connector 14 by means of a pair of ramped detents 36 on the inside of the sheath at the top and bottom thereof. The sheath is slidably mounted onto the plug housing in the direction of arrow 37 (FIG. 1), and ramped detents 36 will ride over a pair of ramps 38 at the top and bottom of plug housing 18. Ramped detents 36 will snap into a pair of securing recesses 40 immediately behind ramps 38 of the plug housing, as is seen in FIGS. 1 and 2. As seen in FIGS. 3 and 4, a front section 42 of plug housing 18 is enlarged to define a shoulder 44 against which the front end of sheath 20 abuts when ramped detents 36 of the sheath are secured within recessed 40 of the plug housing.

Referring to FIGS. 6–10 in conjunction with FIGS. 1 and 2, receptacle connector 16 can take a wide variety of configurations and, therefore, only the mating end of the receptacle connector is shown. The remainder of the connector has been severed along line X—X in FIGS. 1 and 2 as well as in the remaining figures. Suffice it to say, receptacle connector 16 has a generally open mating end 46 which, in this particular example, has an optical element adapter 48 on the inside thereof. The receptacle connector has a pair of cylindrical receptacles 50 for receiving cylindrical plug portions 30 of the plug housing as seen in FIGS. 1 and 2 where plug connector 14 is mated within open mating end 46 of receptacle connector 16.

Figure 6:
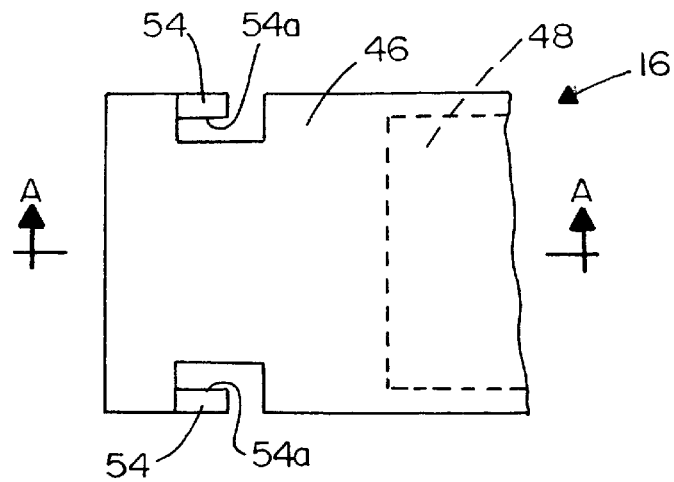
FIG. 6 is a fragmented top plan view of the receptacle connector.
Figure 7:
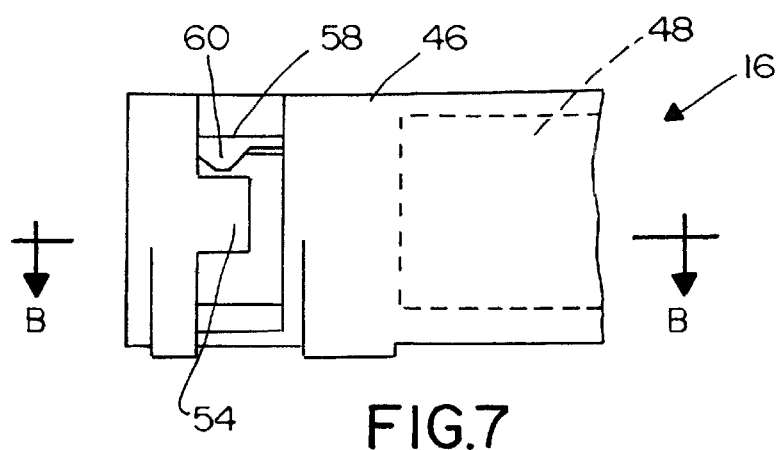
FIG. 7 is a fragmented side elevational view of the receptacle connector.
Figure 8:
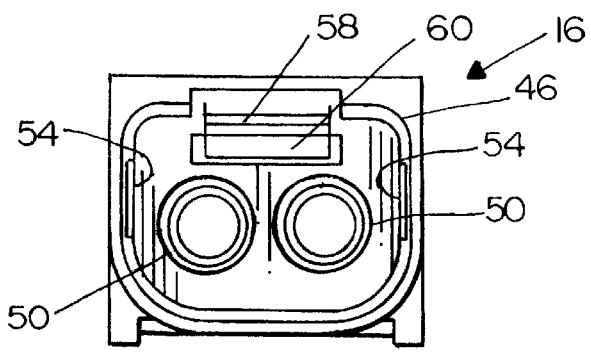
FIG. 8 is an elevational view of the mating end of the receptacle connector.
Figure 9:
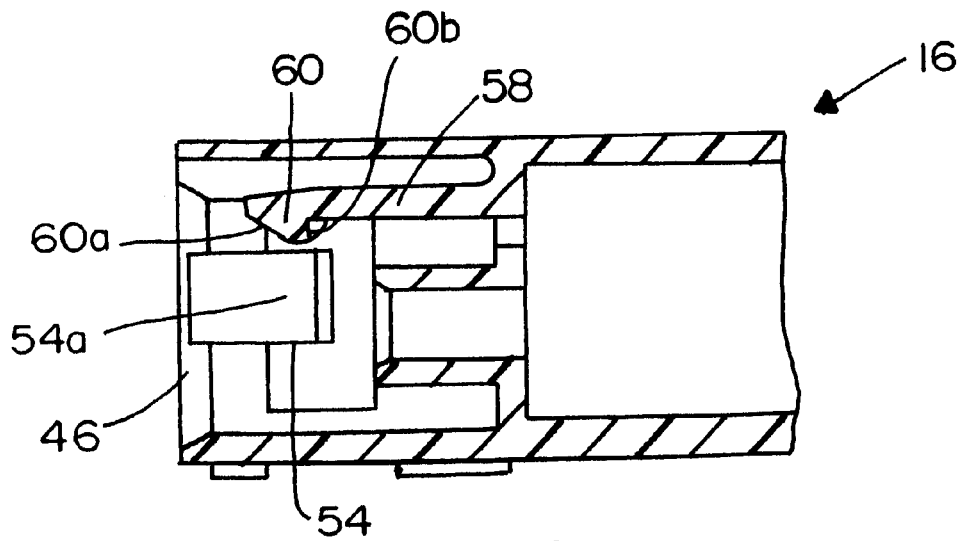
FIG. 9 is a fragmented section taken generally along line A—A in FIG. 6.
Figure 10:
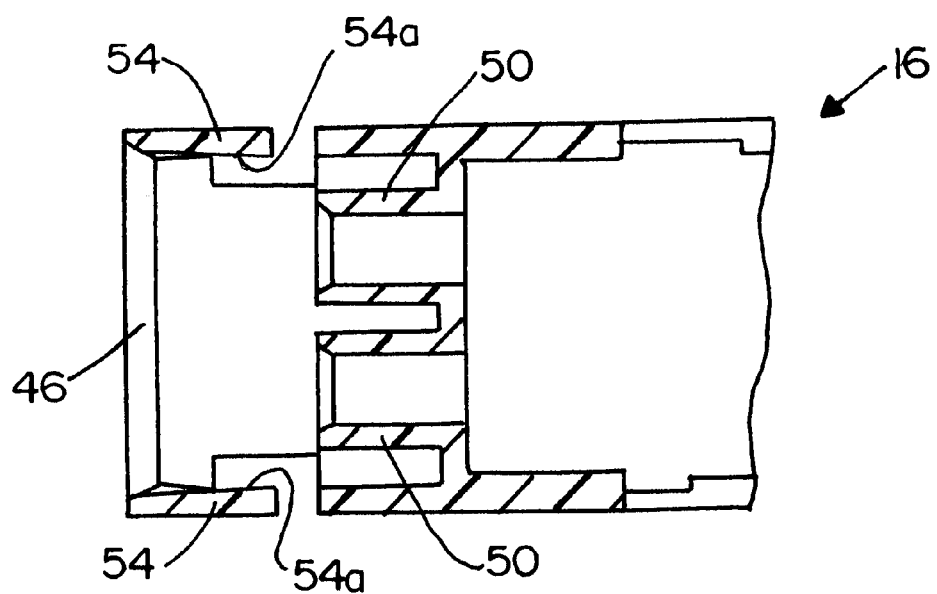
FIG. 10 is a section taken generally along line B—B in FIG. 7.

Generally, complementary interengaging first latch means are provided between plug housing 18 of plug connector 14 and receptacle connector 16 to hold the connector in mated condition as seen in FIG. 1. More particularly, as seen best in FIGS. 3–5, plug housing 18 includes a pair of ramped latch bosses 52 which project outwardly from opposite lateral sides thereof. As best seen in FIGS. 6, 7, 9 and 10, receptacle connector 16 includes a pair of flexible latch members 54 on opposite lateral sides thereof. FIGS. 6 and 10 show that the inside surfaces 54a of latch members 54 converge inwardly. Therefore, when plug connector 14 is mated with receptacle connector 16, ramped latch bosses 52 on opposite sides of plug housing 18 engage inside surfaces 54a of flexible latch members 54 of receptacle connector 16, spreading the flexible latch members outwardly until the latch bosses pass the distal ends of the latch members, whereupon the latch members snap back inwardly into latching engagement behind the latch bosses.

Generally, complementary interengaging second latch means are provided between sheath 20 of plug connector 14 and receptacle connector 16 to hold the connectors in mated condition as seen in FIG. 1. More particularly, as best seen in FIGS. 1–3, sheath 20 includes a pair of upwardly projecting, ramped latch bosses 56. As best seen in FIGS. 1, 2, 7 and 9, receptacle connector 16 has a pair of flexible, cantilevered latch arms 58 which have latch hooks 60 near the distal ends thereof. The latch hooks have chamfered or angled front surfaces 60a and abrupt rear latch surfaces 60b. When plug connector 14 is mated with receptacle connector 16, chamfered surfaces 60a ride over ramped bosses 56, flexing latch arms 58 outwardly, until the latch arms snap back inwardly with latch surfaces 60b in latching engagement with ramped bosses 56 as seen in FIG. 1.

When it is desirable to unmate the connectors, unmating forces are applied to plug connector 14 by grasping sheath 20 and pulling the plug connector away from the receptacle connector in the direction of arrow 62 (FIG. 2). Side latch bosses 52 (FIGS. 3 and 4) of the plug housing of the plug connector will move out of engagement with flexible latch members 54 (FIGS. 6, 7 and 10) of the receptacle connector. In addition, ramped latch bosses 56 (FIGS. 2 and 3) on the sheath of the plug connector will bias latch arms 58 of the receptacle connector upwardly as seen in FIG. 2 to allow unmating of the connectors.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A connector assembly, comprising:

a plug connector including a plug housing and a sheath separate from and mounted about the plug housing;

a receptacle connector having an open mating end for receiving the plug connector in a mated condition inside said open mating end;

complementary interengaging first latch means between the plug housing of the plug connector and the receptacle connector for holding the connectors in said mated condition; and complementary interengaging second latch means between the sheath of the plug connector and the receptacle connector for holding the connectors in said mated condition.

2. The connector assembly of claim 1 wherein said first latch means include at least one flexible latch member on one of said plug housing and said receptacle connector engageable with a complementary latch member on the other of the plug housing and receptacle connector.

3. The connector assembly of claim 2 wherein said first latch means include a pair of flexible latch members on opposite sides of the receptacle connector engageable with a pair of latch bosses on opposite sides of the plug housing of the plug connector.

4. The connector assembly of claim 1 wherein said second latch means include a flexible latch arm on one of said sheath and receptacle connector engageable with a complementary latch member on the other of the sheath and receptacle connector.

5. The connector assembly of claim 4 wherein said flexible latch arm is on one side of the receptacle connector and is engageable with a latch boss on one side of the sheath of the plug connector.

6. A connector assembly, comprising:

a plug connector including a plug housing and a sheath separate from and mounted about the plug housing;

a receptacle connector having an open mating end for receiving the plug connector in a mated condition inside said open mating end;

complementary interengaging first latch means between the plug housing of the plug connector and the receptacle connector for holding the connectors in said mated condition, said first latch means including at least one flexible latch member on one of said plug housing and said receptacle connector engageable with a complementary latch member on the other of the plug housing and receptacle connector; and complementary interengaging second latch means between the sheath of the plug connector and the receptacle connector for holding the connectors in said mated condition, said second latch means including a flexible latch arm on one of said sheath and said receptacle connector engageable with a complementary latch member on the other of the sheath and receptacle connector.

7. The connector assembly of claim 6 wherein said first latch means include a pair of flexible latch members on opposite sides of the receptacle connector engageable with a pair of latch bosses on opposite sides of the plug housing of the plug connector.

8. The connector assembly of claim 7 wherein said flexible latch arm is on one side of the receptacle connector and is engageable with a latch boss on one side of the sheath of the plug connector.

* * * * *